United States Patent
Izquierdo (10) Patent No.: US 10,030,587 B2
(45) Date of Patent: Jul. 24, 2018

(54) ANNULAR AIRFLOW ACTUATION SYSTEM FOR VARIABLE CYCLE GAS TURBINE ENGINES

(71) Applicant: United Technologies Corporation, Hartford, CT (US)

(72) Inventor: Felix Izquierdo, Boynton Beach, FL (US)

(73) Assignee: United Technologies Corporation, Farmington, CT (US)

( * ) Notice: Subject to any disclaimer, the term of this patent is extended or adjusted under 35 U.S.C. 154(b) by 319 days.

(21) Appl. No.: 14/780,388

(22) PCT Filed: Feb. 5, 2014

(86) PCT No.: PCT/US2014/014830
§ 371 (c)(1),
(2) Date: Sep. 25, 2015

(87) PCT Pub. No.: WO2015/030857
PCT Pub. Date: Mar. 5, 2015

(65) Prior Publication Data
US 2016/0053692 A1    Feb. 25, 2016

Related U.S. Application Data

(60) Provisional application No. 61/809,623, filed on Apr. 8, 2013.

(51) Int. Cl.
F02C 9/20    (2006.01)
F02C 3/107    (2006.01)
(Continued)

(52) U.S. Cl.
CPC .............. *F02C 9/20* (2013.01); *F01D 17/162* (2013.01); *F02C 3/107* (2013.01); *F02K 3/075* (2013.01); *F02K 3/077* (2013.01)

(58) Field of Classification Search
CPC ............. F04D 15/0022; F04D 15/0027; F04D 15/0038; F04D 15/0055; F04D 27/002;
(Continued)

(56) References Cited

U.S. PATENT DOCUMENTS 2,648,195 A * 8/1953 Wilde .................. F01D 17/143
123/564
4,546,606 A    10/1985 Bouiller et al.
(Continued)

FOREIGN PATENT DOCUMENTS

DE    2329022    2/1975
GB    757230    9/1956
(Continued)

OTHER PUBLICATIONS

Extended European Search Report dated Apr. 18, 2016.

*Primary Examiner* — Woody Lee, Jr.
*Assistant Examiner* — Brian O Peters
(74) *Attorney, Agent, or Firm* — O'Shea Getz P.C.

(57) ABSTRACT

An annular airflow control system for a gas turbine engine includes a sync ring rotatable to move a multiple of contra-rotating variable vanes between an open position and a closed position to throttle an airflow through said multiple of contra-rotating variable vanes.

10 Claims, 7 Drawing Sheets

(51) Int. Cl.
*F01D 17/16* (2006.01)
*F02K 3/075* (2006.01)
*F02K 3/077* (2006.01)

(58) Field of Classification Search
CPC .. F04D 27/0246; F04D 29/524; F04D 19/024; F02C 9/20; F01D 17/162; F02K 3/075; F24F 13/142; F24F 13/1486
See application file for complete search history.

(56) References Cited

U.S. PATENT DOCUMENTS

| | | | |
|---|---|---|---|
| 4,802,629 A | 2/1989 | Klees | |
| 5,314,301 A * | 5/1994 | Knight | F01D 5/148 415/160 |
| 6,502,383 B1 | 1/2003 | Janardan et al. | |
| 7,413,401 B2 * | 8/2008 | Szucs | F01D 17/162 415/160 |
| 8,297,918 B2 * | 10/2012 | Bhatnagar | F01D 17/162 415/160 |
| 2002/0150471 A1 | 10/2002 | Liu et al. | |
| 2005/0095542 A1 | 5/2005 | Sanders et al. | |
| 2005/0142001 A1 * | 6/2005 | Cornell | B63H 11/08 417/245 |
| 2009/0149124 A1 * | 6/2009 | Stevenson | B60H 1/00671 454/358 |
| 2014/0314549 A1 * | 10/2014 | Pakkala | F01D 9/02 415/148 |
| 2017/0058690 A1 * | 3/2017 | Rice | F01D 9/041 |

FOREIGN PATENT DOCUMENTS

| | | |
|---|---|---|
| GB | 813343 | 5/1959 |
| GB | 1347153 | * 2/1974 |
| JP | 09317557 | 12/1997 |

* cited by examiner

ANNULAR AIRFLOW ACTUATION SYSTEM FOR VARIABLE CYCLE GAS TURBINE ENGINES

This application claims priority to PCT Patent Application No. PCT/US14/14830 filed Feb. 5, 2014, which claims priority to U.S. Patent Appln. No. 61/809,623 filed Apr. 8, 2013.

STATEMENT REGARDING FEDERALLY SPONSORED RESEARCH OR DEVELOPMENT

This disclosure was made with Government support under FA8650-09-D-2923 awarded by The United States Air Force. The Government has certain rights in this disclosure.

BACKGROUND

The present disclosure relates to variable cycle gas turbine engines, and more particularly to an annular airflow control system therefor.

Variable cycle gas turbine engines power aircraft over a range of operating conditions yet achieve countervailing objectives such as high specific thrust and low fuel consumption. The variable cycle gas turbine engine essentially alters a bypass ratio during flight to match requirements. This facilitates efficient performance over a broad range of altitudes and flight conditions to generate high thrust for high-energy maneuvers yet optimize fuel efficiency for cruise and loiter.

Variable cycle gas turbine engines require an effective actuation system to vary the cycle of a third stream bypass airflow to operate the engine at various cycle points.

SUMMARY

An annular airflow control system for a gas turbine engine according to one disclosed non-limiting embodiment of the present disclosure includes a sync ring rotatable to move a multiple of contra-rotating variable vanes between an open position and a closed position to throttle an airflow through the multiple of contra-rotating variable vanes.

A further embodiment of the present disclosure includes, wherein the multiple of contra-rotating variable vanes are located between an outer ring and an inner ring.

A further embodiment of any of the foregoing embodiments of the present disclosure includes, wherein the sync ring is located radially outboard of the outer ring.

A further embodiment of any of the foregoing embodiments of the present disclosure includes an actuator to rotate the sync ring.

A further embodiment of any of the foregoing embodiments of the present disclosure includes, wherein each of the multiple of contra-rotating variable vanes includes a control post and a pivot post that interact with at least one of the outer ring and the inner ring.

A further embodiment of any of the foregoing embodiments of the present disclosure includes, wherein each of the multiple of contra-rotating variable vanes includes a control post and a pivot post that interact with at least one of the outer ring and the inner ring, the control post interacts with a non-linear slot in at least one of the outer ring and the inner ring.

A further embodiment of any of the foregoing embodiments of the present disclosure includes, wherein each of the control posts from each of the multiple of contra-rotating variable vanes extends through a linear slot in the sync ring.

A further embodiment of any of the foregoing embodiments of the present disclosure includes, wherein each of the linear slots are located parallel to a central longitudinal engine axis.

A further embodiment of any of the foregoing embodiments of the present disclosure includes, wherein the non-linear slot alternatively extends proximate either a leading edge or a trailing edge of each of the multiple of contra-rotating variable vanes.

A further embodiment of any of the foregoing embodiments of the present disclosure includes, wherein each of the control posts from each of the multiple of contra-rotating variable vanes extends through a linear slot in the sync ring.

A further embodiment of any of the foregoing embodiments of the present disclosure includes, wherein each of the linear slots are located parallel to a central longitudinal engine axis.

A further embodiment of any of the foregoing embodiments of the present disclosure includes, wherein the non-linear slot is alternatively located either forward or aft of a pivot aperture in the outer ring and the inner ring.

A further embodiment of any of the foregoing embodiments of the present disclosure includes, wherein each of said control posts from each of said multiple of contra-rotating variable vanes extends through a linear slot in said sync ring.

A further embodiment of any of the foregoing embodiments of the present disclosure includes, wherein each of said linear slots are located parallel to a central longitudinal engine axis.

A further embodiment of any of the foregoing embodiments of the present disclosure includes, wherein each of said control posts from each of said multiple of contra-rotating variable vanes alternatively extends proximate either a leading edge or a trailing edge of each of said multiple of contra-rotating variable vanes.

A further embodiment of any of the foregoing embodiments of the present disclosure includes, wherein each of said control posts from each of said multiple of contra-rotating variable vanes extends through a linear slot in said sync ring.

A further embodiment of any of the foregoing embodiments of the present disclosure includes, wherein said airflow path is radially outboard of a primary airflow path that exhausts through a convergent divergent nozzle.

A method of operating a gas turbine engine according to another disclosed non-limiting embodiment of the present disclosure includes throttling an annular airflow path with a multiple of contra-rotating variable vanes.

A further embodiment of any of the foregoing embodiments of the present disclosure includes rotating a sync ring to rotate each of the multiple of contra-rotating variable vanes through interaction with a respective non-linear slot in at least one of an inner ring or an outer ring defined around the multiple of contra-rotating variable vanes.

A further embodiment of any of the foregoing embodiments of the present disclosure includes moving each of the multiple of contra-rotating variable vanes through interaction with a respective linear slot in the sync ring for each of the multiple of contra-rotating variable vanes.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
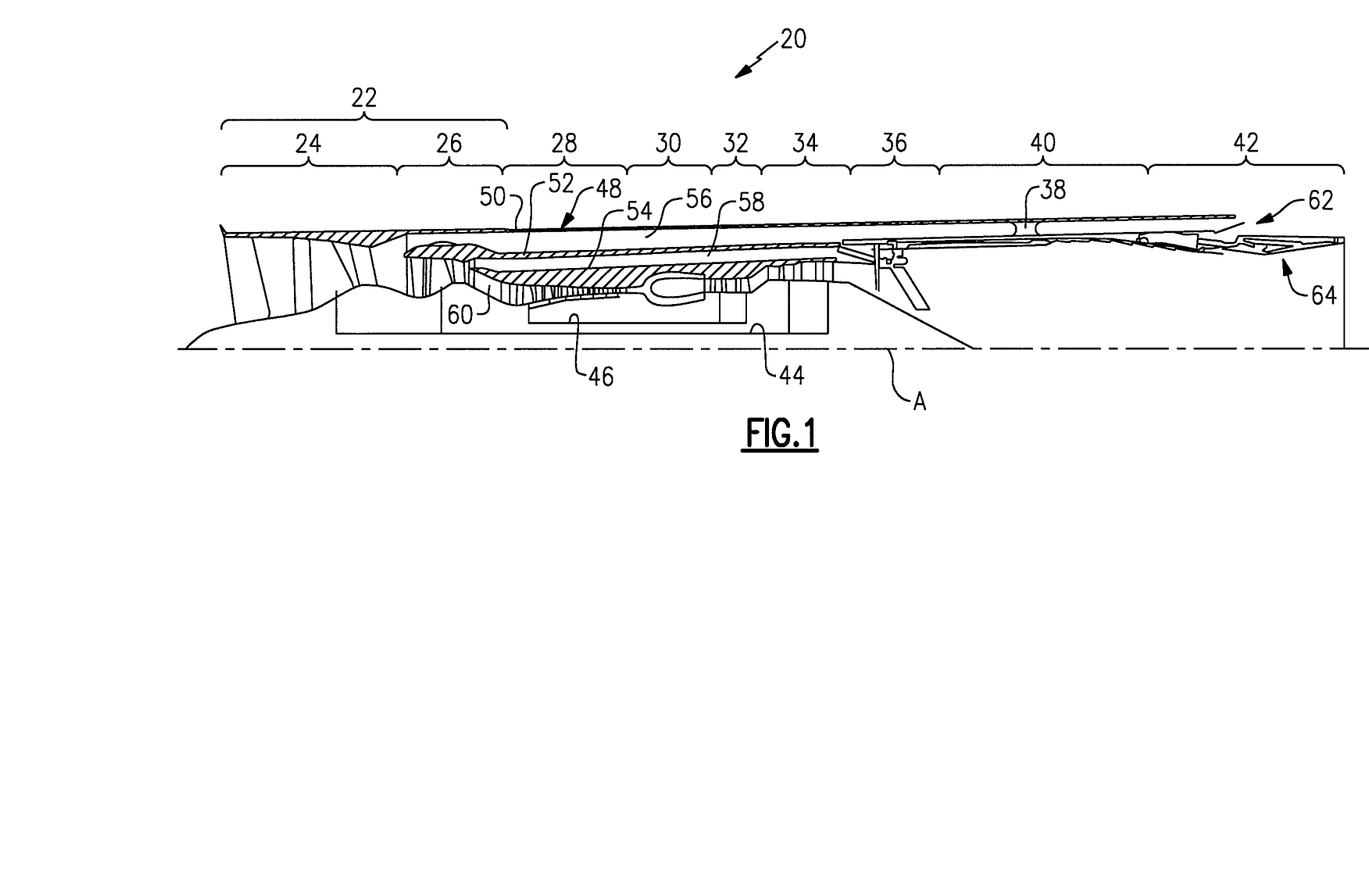
FIG. 1 is a general schematic view of an exemplary variable cycle gas turbine engine according to one non-limiting embodiment.

FIG. 1 schematically illustrates a gas turbine engine 20. The gas turbine engine 20 is disclosed herein as a variable cycle two-spool bypass turbofan that generally includes: a fan section 22 with a first stage fan section 24 and a second stage fan section 26; a high pressure compressor section 28; a combustor section 30; a high pressure turbine section 32; a low pressure turbine section 34; an augmentor section 36; an annular airflow control system 38; an exhaust duct section 40; and a nozzle section 42. Additional sections, systems and features such as a geared architecture that may be located in various engine sections, for example, aft of the second stage fan section 26 or forward of the low pressure turbine section 34. The sections are defined along a central longitudinal engine axis A. Variable cycle gas turbine engines power aircraft over a range of operating conditions and essentially alters a bypass ratio during flight to achieve countervailing objectives such as high specific thrust for high-energy maneuvers yet optimizes fuel efficiency for cruise and loiter operational modes.

The engine 20 generally includes a low spool 44 and a high spool 46 that rotate about the engine central longitudinal axis A relative to an engine case structure 48. Other architectures, such as three-spool architectures, will also benefit herefrom.

The engine case structure 48 generally includes an outer case structure 50, an intermediate case structure 52 and an inner case structure 54. It should be understood that various structures individual or collectively may define the case structures 48 to essentially define an exoskeleton that supports the spools 44, 46 for rotation therein.

The first stage fan section 24 communicates airflow into a third stream airflow path 56 as well as into a second stream airflow path 58 and a core primary airflow path 60 that is in communication with the augmentor section 36. The second stage fan section 26 communicates at least in part with the second stream airflow path 58 and the primary airflow path 60. The fan section 22 may alternatively or additionally include other architectures that, for example, include additional or fewer stages each with or without various combinations of variable or fixed guide vanes.

The core primary airflow is compressed by the first stage fan section 24, the second stage fan section 26, the high pressure compressor section 28, mixed and burned with fuel in the combustor section 30, then expanded over the high pressure turbine section 32 and the low pressure turbine section 34. The turbines sections 32, 34 rotationally drive the respective low spool 44 and high spool 46 in response to the expansion. Each of the turbine sections 32, 34 may alternatively or additionally include other architectures that, for example, include additional or fewer stages each with or without various combinations of variable or fixed guide vanes.

The third stream airflow path 56 is generally annular in cross-section and defined by the outer case structure 50 and the intermediate case structure 52. The second stream airflow path 58 is also generally annular in cross-section and defined by the intermediate case structure 52 and the inner case structure 54. The core primary airflow path 60 is generally circular in cross-section and defined by the inner case structure 54. The second stream airflow path 58 is defined radially inward of the third stream airflow path 56 and the core primary airflow path 60 is radially inward of the core primary airflow path 60. Various crossover and cross-communication airflow paths may alternatively or additionally provided.

The exhaust duct section 40 may be circular in cross-section as typical of an axis-symmetric augmented low bypass turbofan. Alternatively or additionally, the exhaust duct section 40 may be non-axisymmetric in cross-section or other shape and/or non-linear with respect to the central longitudinal engine axis A to form, for example, a serpentine shape to block direct view to the turbine section.

The nozzle section 42 may include a third stream exhaust nozzle 62 (illustrated schematically) which receives flow from the third stream airflow path 56 and a mixed flow exhaust nozzle 64 (illustrated schematically) which receives a mixed flow from the second stream airflow path 58 and the core primary airflow path 60. It should be understood that various fixed, variable, convergent/divergent, two-dimensional and three-dimensional nozzle systems may be utilized herewith.

Figure 2:
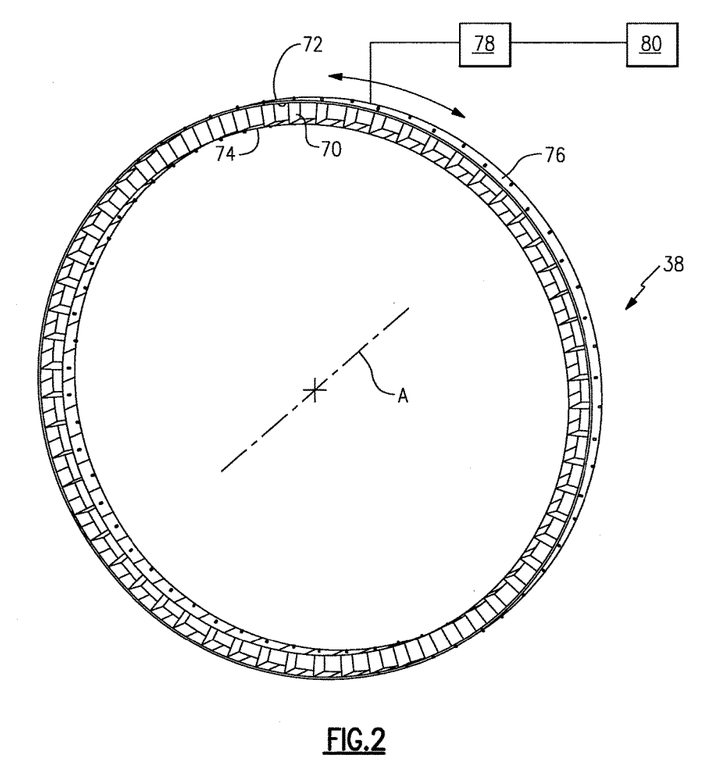
FIG. 2 is a perspective view of an annular airflow control system according to one non-limiting embodiment.

With reference to FIG. 2, the annular airflow control system 38, in one disclosed non-limiting embodiment is located within the third stream airflow path 56 in the region of the exhaust duct section 40 to control the third stream airflow. In the disclosed non-limiting embodiment, the annular airflow control system 38 throttles the airflow in the third stream airflow path 56. In one disclosed non-limiting embodiment, the annular airflow control system 38 may throttle the airflow down to a minimal but non-zero airflow to backpressure the third stream airflow. It should be appreciated that the annular airflow control system 38 may be located in other airflow paths.

The annular airflow control system 38 includes a multiple of contra-rotating variable vanes 70 between an outer ring 72 and an inner ring 74 with a sync ring 76 that is driven by an actuator 78 (illustrated schematically) that operates in response to a control 80 (illustrated schematically). It should be appreciated that various other control components such as sensors, actuators and other subsystems may be utilized herewith.

Figure 3:
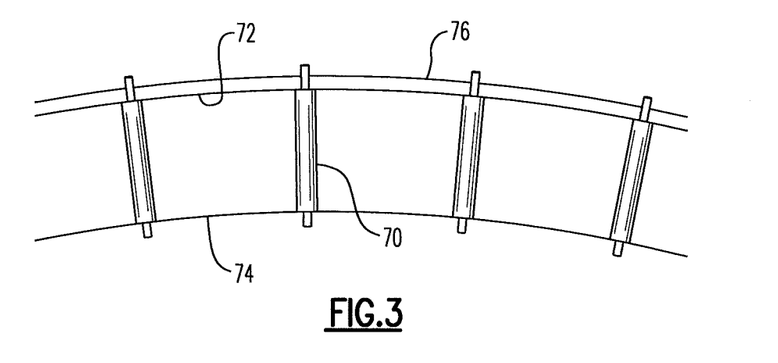
FIG. 3 is a front view of the annular airflow control system in an open position.
Figure 4:
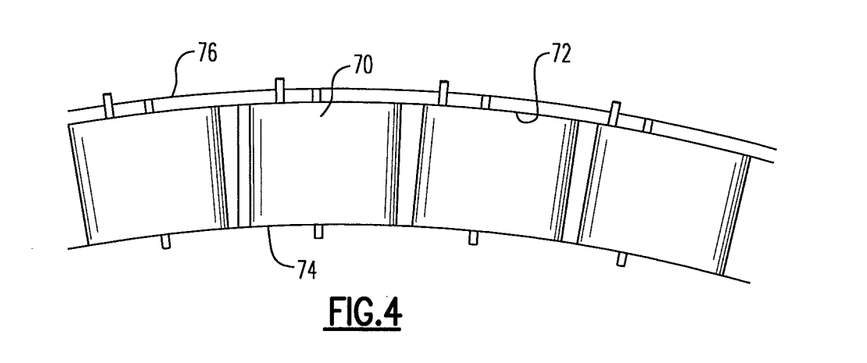
FIG. 4 is a front view of the annular airflow control system in a closed position.
Figure 5:
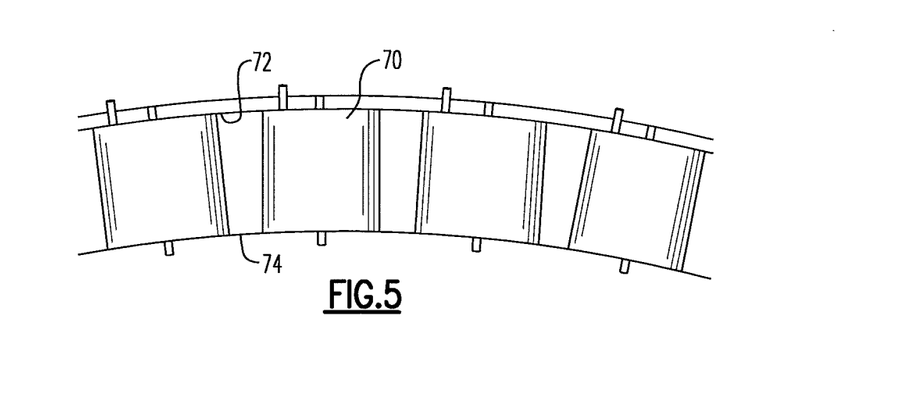
FIG. 5 is a front view of the annular airflow control system in an intermediate position.

The actuator 78 may include a mechanical, electrical and/or pneumatic drive that operates to rotate the sync ring 76 about the engine axis A so as to move the annular airflow control system 38 between an open position (FIG. 3) and a closed position (FIG. 4), through an intermediate position (FIG. 5). That is, the actuator 78 provides the motive force to rotate the sync ring 76 and thereby control an airflow stream in the third stream airflow path 56.

The control 80 generally includes a control module that executes an airflow control logic to thereby control the radial tip clearance relative the rotating blade tips. The control module typically includes a processor, a memory, and an interface. The processor may be any type of known microprocessor having desired performance characteristics. The memory may be any computer readable medium which stores data and control algorithms such as logic as described herein. The interface facilitates communication with other components such as the actuator 78. In one non-limiting embodiment, the control module may be a portion of a flight control computer, a portion of a Full Authority Digital Engine Control (FADEC), a stand-alone unit or other system.

Figure 6:
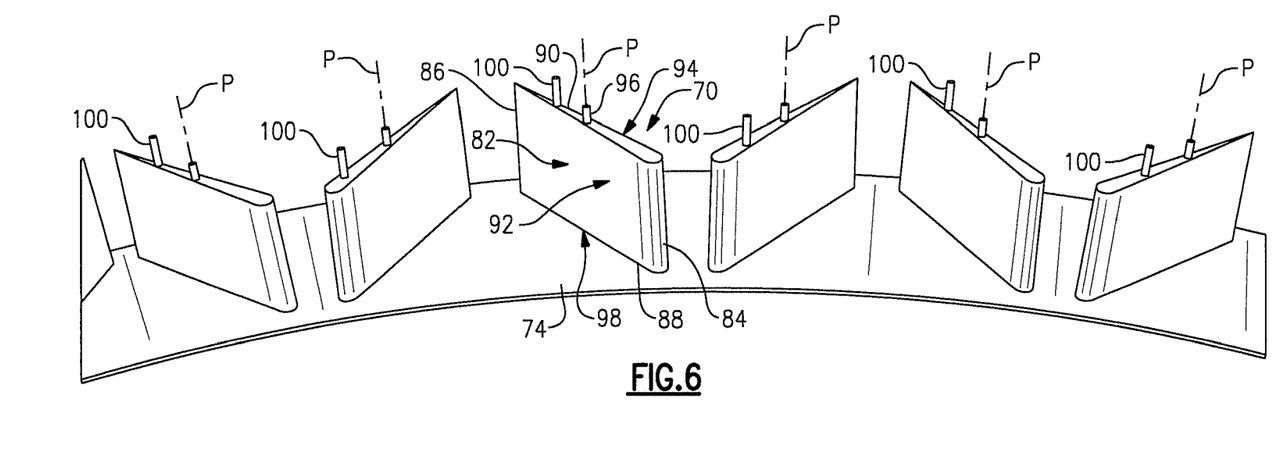
FIG. 6 is a top schematic perspective view of the annular airflow control system in an intermediate position without the outer ring and sync ring shown.

With reference to FIG. 6, each of the multiple of contra-rotating variable vanes 70 are defined by an outer airfoil wall surface 82 between a leading edge 84 and a trailing edge 86 and an inner edge 88 and an outer edge 90. In one disclosed non-limiting embodiment, the outer airfoil wall surface 82 may define a generally concave shaped portion to form a pressure side 92 and a generally convex shaped portion that forms a suction side 94. It should be appreciated that various airfoil and non-airfoil shapes may alternatively be provided.

Each of the multiple of contra-rotating variable vanes 70 includes an outer pivot post 96, an inner pivot post 98 and a control post 100. The outer pivot post 96 and the inner pivot post 98 define a pivot axis P about which each of the multiple of contra-rotating variable vanes 70 pivot. Each outer pivot post 96 and inner pivot post 98 extend through a respective aperture 102, 104 in the outer ring 72 (FIG. 7) and the inner ring 74 (FIG. 8). That is, each of the multiple of contra-rotating variable vanes 70 pivot about a pivot axis P which defines the center of rotation for each of the multiple of contra-rotating variable vanes 70.

Figure 9:
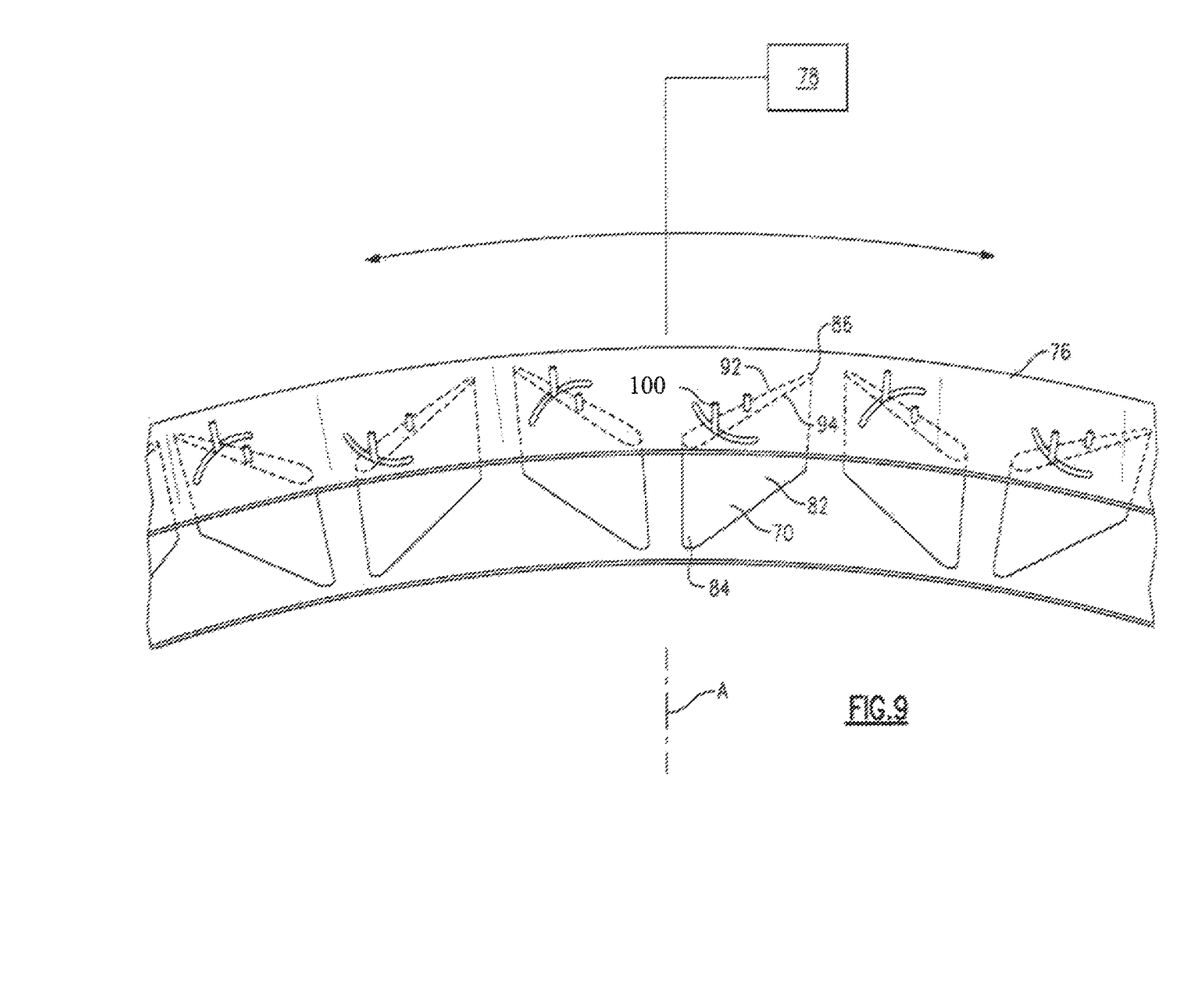
FIG. 9 is a top schematic perspective view of the annular airflow control system in an intermediate position.
Figure 10:
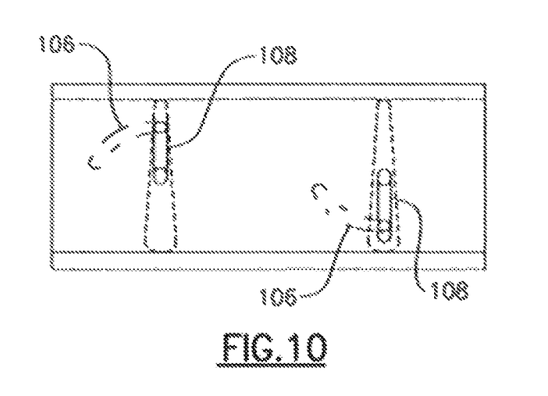
FIG. 10 is a top schematic phantom view of the annular airflow control system in an open position.
Figure 11:
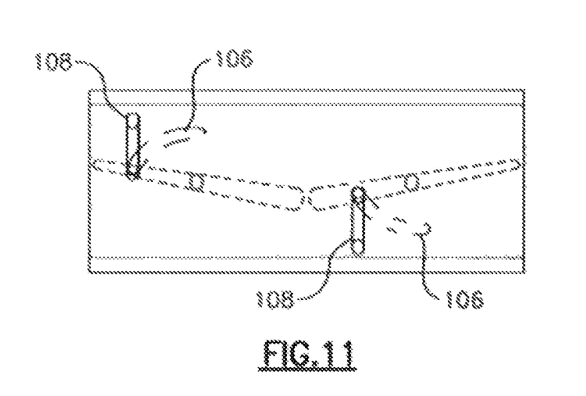
FIG. 11 is a top schematic phantom view of the annular airflow control system in a closed position.
Figure 12:
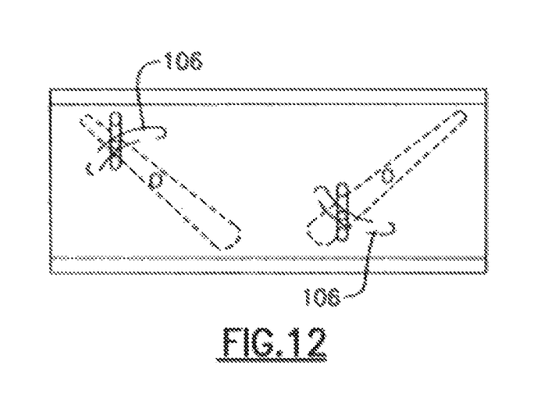
FIG. 12 is a top schematic phantom view of the annular airflow control system in an intermediate position.

The control post 100 may extend from the inner edge 88 and/or the outer edge 90 for respective interface with the outer ring 72 and/or the inner ring 74 as well as the sync ring 76 (FIG. 9). The control post 100 alternatively extends proximate either the leading edge 84 or a trailing edge 86 of each of the multiple of contra-rotating variable vanes 70. That is, of the one example contra-rotating variable vanes 70 that has a control post 100 which extends proximate the leading edge 84 will be between two contra-rotating variable vanes 70 that has the control post 100 proximate the trailing edge 86. It should be appreciated that although the control posts 100 are illustrated as extended from the outer edge 90, the control posts 100 may alternatively extend from the inner edge 88 with an associated inner sync ring 76 (not shown).

Figure 7:
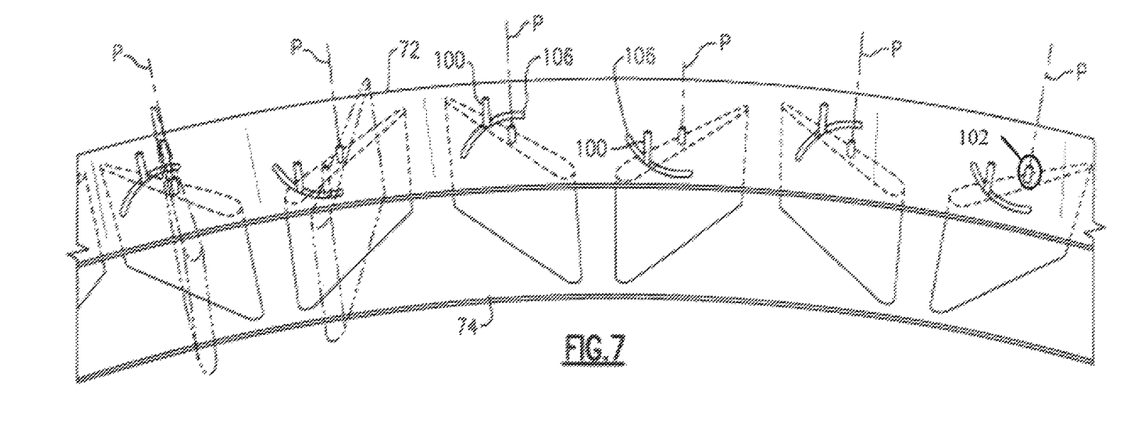
FIG. 7 is a top schematic perspective view of the annular airflow control system in an intermediate position without the sync ring shown.
Figure 8:
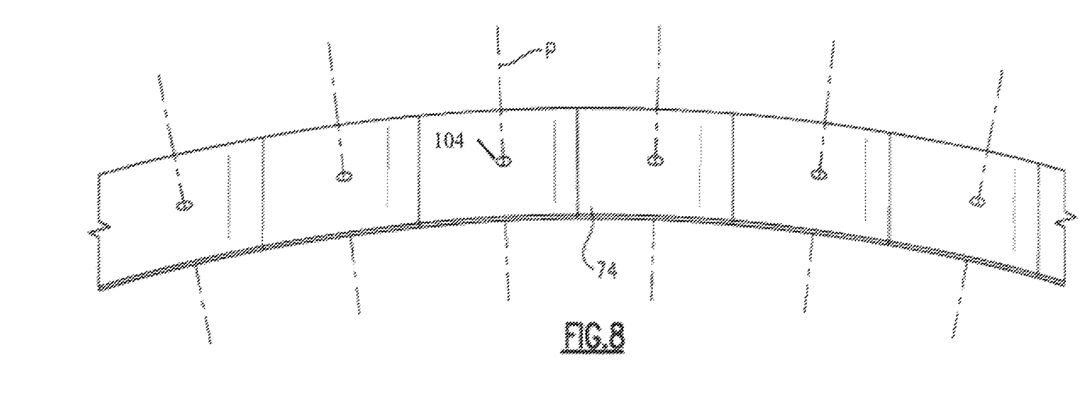
FIG. 8 is a top schematic perspective view of an inner ring of the annular airflow control system.

With reference to FIG. 7, each control post 100 of each of the multiple of contra-rotating variable vanes 70 extends through a respective non-linear slot 106 in the outer ring 72. Each non-linear slot 106 is generally arcuate with a center of the arc defined at the respective aperture 102 in the outer ring 72.

With reference to FIGS. 9-12, each control post 100 of each of the multiple of contra-rotating variable vanes 70 further extends through a respective linear slot 108 in the sync ring 76.

In operation, the actuator 78 rotates the sync ring 76. Each linear slot 108 drives the respective control post 100 of each of the multiple of contra-rotating variable vanes 70 in its respective non-linear slot 106 such that the multiple of contra-rotating variable vanes 70 are moved between the open position (FIG. 10) and the closed position (FIG. 11), through the intermediate position (FIG. 12) in a contra-rotating manner.

The annular airflow control system 38 readily controls airflow through an annular airflow path to enhance engine operability and performance. Furthermore, the contra-rotating motion provides a relatively balanced response to the airflow to minimize actuator 78 power requirements.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. An annular airflow control system for a gas turbine engine comprising:

a multiple of contra-rotating variable vanes; and a sync ring rotatable to move the multiple of contra-rotating variable vanes between an open position and a closed position to throttle an airflow through said multiple of contra-rotating variable vanes, wherein said multiple of contra-rotating variable vanes are located between an outer ring and an inner ring, wherein each of said multiple of contra-rotating variable vanes includes a control post and a pivot post that interact with at least one of said outer ring and said inner ring, said control post interacts with a non-linear slot in at least one of said outer ring and said inner ring, wherein each of said control posts from each of said multiple of contra-rotating variable vanes extends through a linear slot in said sync ring, and wherein each of said linear sots are located parallel to a central longitudinal engine axis.

2. The system as recited in claim 1, wherein said sync ring is located radially outboard of said outer ring.

3. The system as recited in claim 2, further comprising an actuator to rotate said sync ring.

4. The system as recited in claim 1, wherein said non-linear slot alternatively extends proximate either a leading edge or a trailing edge of each of said multiple of contra-rotating variable vanes.

5. The system as recited in claim 1, wherein said non-linear slot is alternatively located either forward or aft of a pivot aperture in said outer ring and said inner ring.

6. An annular airflow control system for a gas turbine engine comprising:

a multiple of contra-rotating variable vanes; and a sync ring rotatable to move the multiple of contra-rotating variable vanes between an open position and a closed position to throttle an airflow through said multiple of contra-rotating variable vanes, wherein said multiple of contra-rotating variable vanes are located between an outer ring and an inner ring, wherein each of said multiple of contra-rotating variable vanes includes a control post and a pivot post that interact with at least one of said outer ring and said inner ring, said control post interacts with a non-linear slot in at least one of said outer ring and said inner ring, wherein said non-linear slot is alternatively located either forward or aft of a pivot aperture in said outer ring and said inner ring.

7. The system as recited in claim 6, wherein each of said control posts from each of said multiple of contra-rotating variable vanes extends through a linear slot in said sync ring.

8. The system as recited in claim 6, wherein said sync ring is located radially outboard of said outer ring.

9. The system as recited in claim 8, further comprising an actuator to rotate said sync ring.

10. The system as recited in claim 6, wherein said non-linear slot alternatively extends proximate either a leading edge or a trailing edge of each of said multiple of contra-rotating variable vanes.

* * * * *

UNITED STATES PATENT AND TRADEMARK OFFICE
CERTIFICATE OF CORRECTION

PATENT NO. : 10,030,587 B2
APPLICATION NO. : 14/780388
DATED : July 24, 2018
INVENTOR(S) : Izquierdo Page 1 of 1

It is certified that error appears in the above-identified patent and that said Letters Patent is hereby corrected as shown below:

In the Claims

Column 7, Line 17, please delete "sots" and insert --slots--.

Signed and Sealed this
Twenty-eighth Day of August, 2018

Andrei Iancu
*Director of the United States Patent and Trademark Office*